United States Patent
Rose

[11] Patent Number: 6,080,314
[45] Date of Patent: Jun. 27, 2000

[54] ZEOLITE BED LEACH SEPTIC SYSTEM AND METHOD FOR WASTEWATER TREATMENT

[76] Inventor: Jane Anne Rose, 4 Turner La., Lancaster, Mass. 01523

[21] Appl. No.: 09/013,614

[22] Filed: Jan. 26, 1998

Related U.S. Application Data

[63] Continuation-in-part of application No. 08/954,667, Oct. 20, 1997, Pat. No. 5,911,876, which is a continuation-in-part of application No. 08/593,883, Jan. 30, 1996, Pat. No. 5,679,256, which is a continuation of application No. 08/262,767, Jun. 20, 1994, abandoned.

[51] Int. Cl.⁷ ............................................. C02F 9/00
[52] U.S. Cl. ..................... 210/631; 210/670; 210/683; 210/747; 210/170; 210/269; 210/903
[58] Field of Search ................................. 210/631, 670, 210/681, 747, 170, 184–186, 265, 266, 269, 532.2, 903, 683

[56] References Cited

U.S. PATENT DOCUMENTS

| | | | |
|---|---|---|---|
| 4,184,947 | 1/1980 | Demisch | 210/631 |
| 4,219,441 | 8/1980 | Noshimura et al. | 210/673 |
| 4,695,387 | 9/1987 | Berry et al. | 210/681 |
| 5,198,113 | 3/1993 | Daniels | 210/170 |

*Primary Examiner*—Ivars Cintins
*Attorney, Agent, or Firm*—Richard P. Crowley

[57] ABSTRACT

A septic system and method for the removal of nitrogen contaminants, such as nitrates and ammonia, from a wastewater effluent, which system and method includes employing one or more zeolite tanks, which contains a regenerable, granulated zeolite material to receive wastewater effluent from a septic tank, and to capture the nitrogen contaminants, such as nitrate and ammonia, and retain the nitrogen contaminants in the zeolite material allowing the treated, decontaminated effluent to flow out of the tank into a leach field. The system and method includes for periodically regenerating the zeolite material in the zeolite tank, after the zeolite material has become substantially exhausted, and restoring the zeolite material in the zeolite tank for reuse. The system provides for removal of the displaced nitrogen contaminants generated from the regeneration of the zeolite material in the zeolite tank.

22 Claims, 1 Drawing Sheet

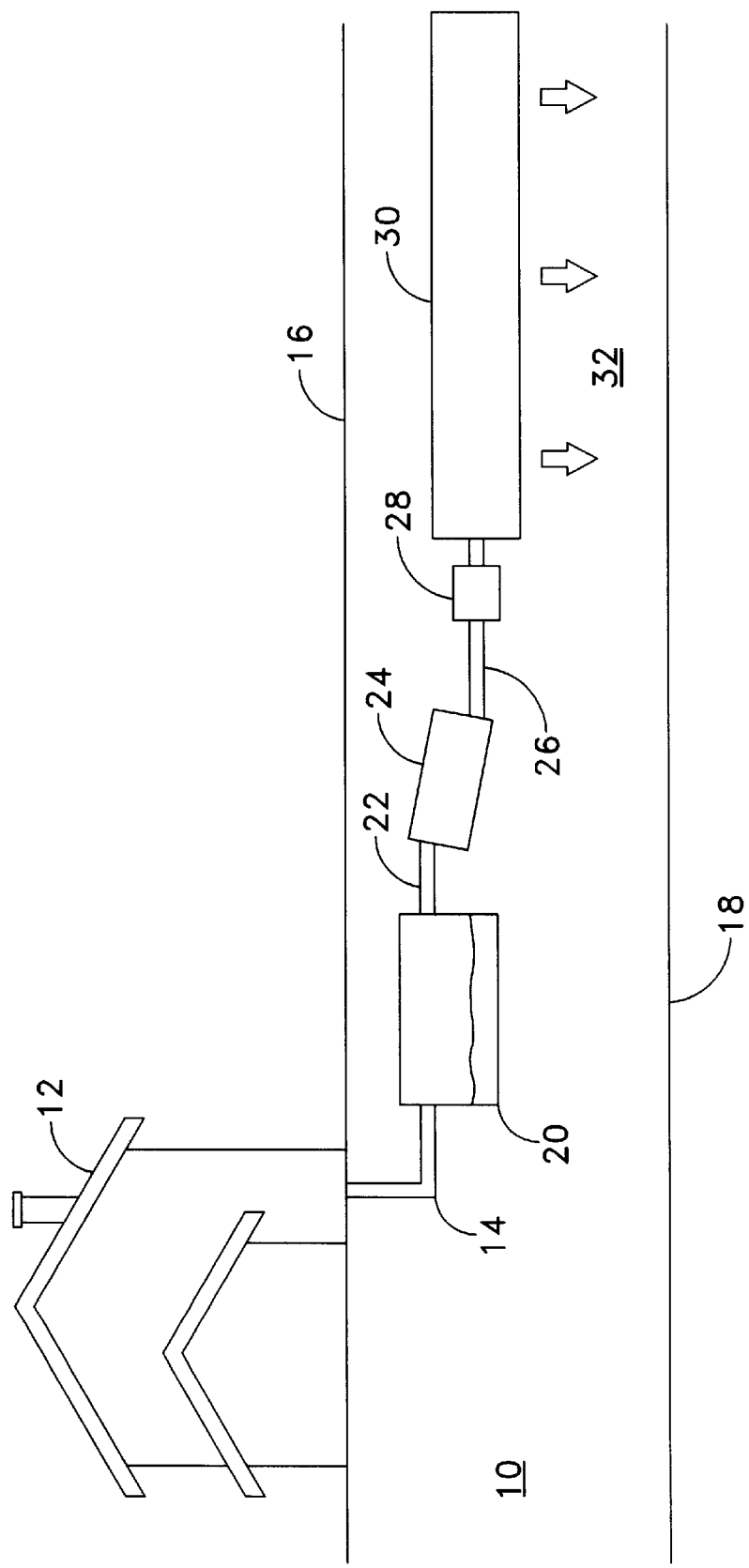

ZEOLITE BED LEACH SEPTIC SYSTEM AND METHOD FOR WASTEWATER TREATMENT

REFERENCE TO PRIOR APPLICATIONS

This application is a continuation-in-part (cip) patent application of U.S. Ser. No. 08/954,667, filed Oct. 20, 1997 now U.S. Pat. No. 5,911,876, issued Jun. 15, 1999, which application is a continuation-in-part (cip) of U.S. Ser. No. 08/593,883, filed Jan. 30, 1996, now U.S. Pat. No. 5,679,256, issued Oct. 21, 1997, which patent application is a continuation of U.S. Ser. No. 08/262,767, filed Jun. 20, 1994, now abandoned.

BACKGROUND OF THE INVENTION

The parent application is hereby incorporated by reference in its entirety and is directed to a method and system for the in situ removal of radionuclides from a groundwater radionuclide contaminated water source, such as a moving, underground water plume. The parent application provides for a trench or a bed above groundwater level and containing therein, granulated zeolite material, and with the trench having a bottom water barrier lining.

Groundwater containing the radionuclides is distributed, such as by pumping from a water source, generally uniformly, over the top of the zeolite material in the trench, in order to filter the radionuclide contaminated water source through the zeolite bed to remove the radionuclides, or rather metal contaminants, cations, i.e., using the zeolite material, such as by ion exchange with the zeolite material, or more typically by capture of the radionuclides or other contaminates in the internal lattice structure of the zeolite material. The system and method also provides for the discharge of the treated water from the bottom of the trench containing the zeolite material, or recycling all or part of the treated water, as desired, back to the trench for continuous treatment, until the desired level of treatment water is obtained. The system and method also includes for the in situ closure of the trench with the zeolite material, by covering the trench of the zeolite material, for example, with a plastic or clay layer, and subsequently burying the trench with soil to close the bed after the exhaustion of the process by the zeolite material, thereby providing for the in situ treatment and removal of radionuclides or other contaminants from the contaminated water source.

Septic systems are commonly used for the treatment of domestic wastewater, and such septic systems include a septic tank to receive a flowing wastewater effluent or sewerage, typically, from a residence or small business, and which effluent sewerage includes solid matter, and wherein the septic tank bacteria breaks down the sewerage and solid matter. The septic system normally includes one or more leaching fields to receive the continuously flowing treated effluent or "grey water" from the septic tank. Generally, the septic systems are employed in those suburban or farm areas where there is a lack of a central or municipal sewerage facility. Approximately ⅓ of all households in the United States dispose of domestic wastewater through the use of septic tank systems. However, due to poor construction and maintenance or geologic conditions, septic tank systems have polluted underlying ground waters and surface waters, such as streams, rivers, ponds, estuaries and bays.

While septic systems with the septic tank and leach field are acceptable, septic system problems are magnified by the fact that in many areas, particularly rural communities, a substantial reliance on subsurface sewage disposal systems is paralleled by a reliance on private wells for drinking water supplies. These problems, which stem from the nutrient-rich composition of the septic tank effluent water when it reaches the leach field, create hazardous conditions in certain areas. For example, where soils are sandy and well-drained, and on-site groundwater is also a source of drinking water for the domicile, nutrient-rich water from leachate can contaminate the drinking water source. Nutrient-rich leachate from home septic systems can cause unacceptably high nitrate levels in drinking water, resulting in "blue baby" syndrome and other health problems. Nitrogen is a key nutrient of concern because it contributes to the eutrophication of surface water, as well as posing health hazards in groundwater. Nitrates in drinking water, derived from wells where septic system are also present on-site, constitute a widespread, intractable problem throughout the United States. It is therefore desirable to provide for a new and improved septic system and method for the treatment of wastewater effluent and sewerage.

SUMMARY OF THE INVENTION

The invention relates to a zeolite-augmented bed septic system and method for the treatment of wastewater, particularly through the use of zeolite material in an adjunct tank between the septic tank and the leaching field.

The invention relates to a septic system for the removal of contaminants, particularly nitrogen contaminants, such as ammonia from wastewater effluent, which septic system comprises a source of wastewater containing nitrogen and other contaminants, such as ammonia and phosphorus, and typically a residence or small business employing such a septic system, and more particularly, wherein the septic system is located in a very low-soil absorbing geographical areas, such as Cape Cod. The system includes a septic tank, connected to said wastewater source to receive septage, including solid matter and the septic tank containing bacteria therein for the treatment of said septage and to provide a wastewater treated effluent from said septic tank. The system also includes a zeolite-filled tank (or bed) in the ground, above groundwater to receive the wastewater effluent from the septic tank and one or more leaching fields. The second tank contains granulated zeolite material selected to capture and retain the nitrogen and other nutrients and contaminants in the wastewater effluent from the septic tank. Inflow to the zeolite tank is composed of nutrient-rich wastewater effluent from the septic tank. Outflow from the tank is effluent that has been filtered by the zeolite in the tank, and no longer contains nutrient contaminants. Outflow from the tank is piped to a standard leach field where it will leach into the groundwater. A septic system also includes means to regenerate periodically, as desired, the zeolite material in the zeolite tank when the zeolite material can no longer substantially capture the nitrogen contaminants from the treated wastewater effluent, and includes a means to remove the displaced nitrogen contaminants generated from the regeneration of the zeolite material.

Generally, the septic tank and the zeolite tank are employed as an underground septic system, above groundwater level in a well drained, typically sandy soil, and wherein the nitrogen contaminant in the wastewater effluent comprises primarily nitrates and ammonia, and wherein the zeolite material comprises a granulated, natural zeolite material, placed in one or more concrete tanks, preceding the leach field trench or bed. The zeolite material in the tank may be regenerated in a number of ways; for example, by the use of liquid solution with cations or other compounds to displace the nitrogen contaminants, such as ammonia, captured within the zeolite material; the means are provided to remove the released nitrogen contaminants, such as by the employment of a pump means to pump out the septic tank or leaching field, or a heating means to heat the zeolite material to displace the nitrogen contaminants, such as ammonia, as a gas and either to permit the escape of the gas or to capture the gas. The zeolite material in the zeolite tank field may also be regenerated by nitrifying bacteria introduced into the zeolite material which may be included as nonpathogenic organisms within the zeolite material.

The zeolite tank may be equipped with shut-off valves at the intake and outflow, and piped openings on top of the tank, through which a flushing hose may be introduced to flush the zeolite with regenerating fluid, which is then extracted. The extracted regenerating fluid then contains the nitrogen contaminants previously stored in the zeolites, and the zeolites are recharged and ready to receive and decontaminate effluent from the septic tank.

The invention also comprises a method for the removal of nitrogen contaminants, more particularly ammonia, from wastewater effluent from a septic system, and which method would comprise introducing a wastewater effluent from a septic system and containing nitrogen contaminants, such as ammonia, into one or more zeolite-filled tanks, and which one of the zeolite tanks would comprise regenerable particulate zeolite material selected to capture, and retain therein the nitrogen contaminants in the wastewater effluent from the septic system.

The method would include periodically regenerating the zeolite material after the zeolite material has been substantially exhausted, by capturing the nitrogen contaminants, by treating the zeolite material, such as by, but not limited to heating liquid solutions, flushing with saline water, bacteria or other means to otherwise remove or displace the captured nitrogen contaminants from the zeolite material in the zeolite tank, to restore the zeolite material in the zeolite tank for reuse. The method would include removing the displaced nitrogen contaminant material by separately treating the escaped contaminant material, or permitting the material to be discharged into the atmosphere, or otherwise treating or removing the displaced nitrogen material from the zeolite tank contained in the septic system.

One embodiment of the zeolite septic system and method may be called the Cape Cod disposal system. This embodiment consists of an underground tank filled with zeolite material, installed at a residence or small business as an adjunct to a septic tank, to be an adjunct to the typical septic tanks and leach field commonly used in a home septic system. The zeolite material in the tank removes ammonia and other contaminants received from the septic tank wastewater. Ammonia in wastewater is a major problem on Cape Cod, and similar soil areas (e.g., Long Island, N.Y.) that generally resisted installing municipal sewers in favor of individual septic systems. The septic systems (mainly the leach fields) cause nitrogen loading in the rivers, ponds, groundwater, and coastal areas, leading to algal blooms and eutrophication of water bodies. One way to remedy the situation would be to construct wastewater treatment plants, connect homes to public sewer, treat the waste in the treatment plant and pump the effluent out to the ocean. The Cape Cod disposal system is a much less expensive way to remedy the problem, and does not contribute to, and in fact prevents ocean eutrophication.

An ordinary leach field or soil absorption system is constructed in coarse-grained sandy soil of varying mineral composition. Water must be able to percolate through the soil quickly in order for a site to be approved by regulating agencies for leach field construction. Wastewater enters a leach field by way of a distribution box and piping from the septic tank. The immediate source of the wastewater is a septic tank, into which all of the bath, kitchen and laundry wastes from a home are piped. The solids settle to the bottom of the septic tank, and the liquid wastewater effluent flows out of the tank and into the leach field through a pipe exiting near the top of the tank. The wastewater is distributed by a distribution box and gallery piping along the top of the one or more leaching beds.

Regulations and construction restrictions are imposed by governmental agencies to assure that the leach field will function properly. The soil must be well drained. Bedrock and stony areas are prohibited as building sites, as are steep slopes and unstable areas. Disturbed ground may not be used, nor may low lying areas near coastal areas or surface waters. Leach fields are always constructed in the unsaturated zone, well above groundwater, and as far as possible from wells and water supplies.

Geologically, Cape Cod is a glacial outwash plain composed of clean quartz sands (the sands have actually been very well washed by the glacial meltwater). The groundwater under the sands is a sole source aquifer, which has been granted special protection status, because it is the only source of fresh water on Cape Cod. All of the surface water bodies on the Cape are directly connected to this aquifer. Cape Cod is a nitrogen sensitive area. One cause of nitrogen sensitivity on Cape Cod is the difference in soil mineralogy between Cape Cod, with its stable quartz sands, and continental areas which contain soils of varying compositions, charges, and grain sizes. Clays are typical constituents of continental soils, and clays generally have good absorptive properties. Cations, like nitrogen, are attracted to the charged region between the clay layers and are held between the layers by ionic bonds. Other types of silicate minerals typical of continental areas have varying absorptive properties, depending on their crystal structure, ionic charge, and composition.

On the opposite end of the soil spectrum are Cape Cod sands, which are non-absorptive, mono-mineralic quartz grains with a framework crystal structure that has no charge, and no spaces in the framework where cations can enter. On Cape Cod, there is nowhere for the nitrogen from the leach fields to go, but into the aquifer and surface waters, because the quartz sands will not absorb it. This in turn creates algal blooms, weed-choked ponds and low oxygen conditions in the water, unfavorable for fish and shellfish. Percolation ("perc") tests are required prior to leach field construction to ensure that the soil will drain well enough for a septic system to function. On Cape Cod, the soils are too well-drained for an ordinary septic system to function properly, allowing contaminated water to leach into the aquifer.

The Cape Cod septic zeolite waste disposal system and method, when used with an ordinary, functional septic tank, will remove nitrogen and other unwanted constituents from wastewater, and hold them within the tank until they are removed by reactivation of the zeolite. Reactivation of the zeolite material in the zeolite tank would be part of the normal maintenance of the septic system. The size of the zeolite tank could be adjusted to allow for reactivation of the zeolite tank to coincide with septic tank pumping.

The size of the Cape Cod leach field may be calculated, for example, on a "gallons per day" basis. A two bedroom home is required by state regulations in Massachusetts to provide a septic system able to handle 220 gallons of wastewater per day, while a 10 bedroom bed-and-breakfast must handle a minimum of 1000 gallons per day. A generous estimate for the amount of granulated, natural, zeolite material required for a zeolite tank for the bed-and-breakfast would be ½ ton, which would occupy 15 cubic feet of space. The cost of crushed and screened clinoptilolite, one example of a zeolite capable of removing 99% of nitrogen from septic waste material effluent, is reported to be between $200 to $300 a ton.

Zeolites have been used as a treatment for wastewater in municipal wastewater treatment plants and combined sewer overflows in some U.S. cities and Japan. Clinoptilolite has been the zeolite of choice, but experiments show that phillipsite, mordenite and erionite also work well. Natural zeolites are much less expensive than synthetic zeolites, though synthetic zeolites would also work well in the Cape Cod disposal system. In a demonstration project of an exchangefiltration system for wastewater treatment using natural clinoptilolite, conducted by the EPA in Syracuse, N.Y., ammonia in wastewater effluent was reduced to 0.02 mg/l. Significant reductions in bacteria, oxygen-demanding constituents, and other pollutants were realized as well.

Breakthrough exchange capacity occurs when the zeolite material can no longer absorb ammonia. Each type of zeolite has an associated exchange capacity, which determines when the Cape Cod disposal system requires regeneration. Once regenerated, the zeolite tank will continue to remove pollutants from wastewater. Several means of regeneration are available, including chemical, thermal and biological. Chemical methods employ a liquid solution containing a cation that enters the zeolite molecule, displacing the ammonia, which is then carried off in solution and may be used as fertilizer. Calcium and sodium are suitable cations. A simple regenerating liquid is sodium chloride (NaCl) in the same concentration as seawater.

Thermal regeneration is also very effective for complete regeneration of the zeolite material. Heating coils in the zeolite tank that could heat the spent zeolite up to 500 degrees celsius would produce a system that could be regenerated by a switch that controls the heating coils. A gas trap could be used to capture the nitrogen that off gases.

Biological regeneration by nitrifying bacteria would occur over time if the tank were aerated. Static ammonia exchange tests indicate that clinoptilolite will regenerate 80% of its ability to remove ammonia in 30 to 40 days, using only the naturally occurring nitrifiers. When the system is spiked with additional nitrifying bacteria, the regeneration time is halved. Since regular maintenance of septic systems is required by state law, regeneration of the zeolites in the Cape Cod waste disposal system should be performed by technicians coincident with tank pumping to ensure compliance and proper function.

The invention will be described for the purpose of illustration only in connection with certain illustrated embodiments; however, it is recognized that various changes, modifications, additions and improvements may be made by those persons skilled in the art to the septic system, zeolite tank, and leach field method and system of the invention, as described and disclosed, without departing from the scope of the invention.

BRIEF DESCRIPTION OF THE DRAWING

The drawing is a schematic illustrative view of the zeolite material septic system and method of the invention for the treatment of wastewater from a septic tank.

DESCRIPTION OF THE EMBODIMENTS

The drawing illustrates a zeolite septic tank system 10 comprising a residence 12, a source of residential waste sewerage which is transmitted through sewer pipe 14 beneath ground level 16 with the groundwater level 18 below a septic tank 20 into which the waste sewerage is deposited for bacterial decomposition of the solid material.

A sewer pipe 22 at or near the top of the septic tank 20 transmits liquid effluent through a zeolite tank 24, containing therein regenerable, synthetic or natural granulated zeolite material to capture the nitrogen contaminants, particularly nitrate and ammonia therein, which zeolite-filled tank may be angled slightly to allow the effluent water to flow through the zeolite by means of gravity. The decontaminated effluent flows, via pipe 26, through distribution box 28 to one or more leach fields, with one leach field 30 illustrated. The treated effluent, reduced in nitrogen contaminants, percolates into the underlying soil of the leach field 32, as illustrated by the flow arrow.

What is claimed is:

1. A septic system for the removal of nitrogen contaminants from wastewater effluent from a septic tank in a tank located between the septic tank and a leach field, and which system comprises;

a) a source of wastewater containing nitrogen contaminants;

b) a septic tank connected to said source of wastewater containing nitrogen contaminants to receive such wastewater, to treat the wastewater, and to provide a wastewater effluent from said septic tank;

c) zeolite tank means containing zeolite material selected to capture and retain, within the zeolite material, the nitrogen contaminants from the wastewater effluent received from the septic tank to provide a decontaminated wastewater effluent, and outflow piping to conduct the decontaminated wastewater effluent to a leach field means;

d) leach field means in the ground, above groundwater level, to receive the decontaminated wastewater effluent from the zeolite tank means;

e) means to regenerate periodically, the zeolite material in the zeolite tank means, when the zeolite material can no longer substantially capture and retain the nitrogen contaminants in the wastewater effluent; and f) means to remove the nitrogen contaminants generated from the regeneration of the zeolite material in the zeolite tank means.

2. The system of claim 1 wherein the septic system is an underground septic system in non-absorptive, monomineralic quartz sand soil.

3. The system of claim 1 wherein the nitrogen contaminants comprises primarily nitrates and ammonia.

4. The system of claim 1 wherein the zeolite material comprises granulated natural zeolite material.

5. The system of claim 1 wherein the zeolite material is selected from the group consisting of: clinoptilolite, phillipsite, mordenite, and erionite and combinations thereof.

6. The system of claim 1 wherein the means to remove the nitrogen contaminant comprises pump means connected to the zeolite tank means to pump out the zeolite tank means.

7. The system of claim 1 wherein the means to regenerate the zeolite material comprises a liquid cation solution to displace the nitrogen contaminants from the zeolite material.

8. The system of claim 1 wherein the means to regenerate the zeolite material comprises a heating means to heat the zeolite material, to displace the nitrogen contaminant as a gaseous material.

9. The system of claim 8 which includes capture means, to capture the displaced gaseous material.

10. The system of claim 1 wherein the means to regenerate the zeolite material in the zeolite tank means comprises nitrifying bacteria introduced into the zeolite tank means.

11. The system of claim 1 wherein the zeolite tank means comprises a plurality of parallel zeolite tank means of zeolite material, connected to the septic tank, to provide one zeolite tank not in use, while the other zeolite tank is in use for decontaminating wastewater effluent from the septic tank.

12. The system of claim 1 which includes means to adjust the pH of the wastewater effluent entering the zeolite tank means.

13. The system of claim 1 wherein the zeolite tank means is tilted to provide gravity flow of the wastewater effluent through the zeolite tank means.

14. The system of claim 1 wherein the means to regenerate includes a source of saltwater connected to the zeolite tank means.

15. A method for the removal of nitrogen contaminants from a wastewater treated effluent from a septic system containing a septic tank, a zeolite material tank, and a leach field, which method comprises:

a) introducing a wastewater effluent derived from a septic tank and containing nitrogen contaminants into a zeolite tank, which zeolite tank comprises contained, regenerable, particulate zeolite material selected to capture and retain the nitrogen contaminants in the wastewater effluent which subsequently flows to a leach field;

b) capturing and retaining, in the zeolite material in the zeolite tank the nitrogen contaminants until the zeolite material has been substantially exhausted;

c) regenerating periodically, the zeolite material in the zeolite tank by treating the zeolite material to displace the captured nitrogen contaminants from the zeolite material;

d) removing the displaced nitrogen contaminate from the regenerated zeolite material in the zeolite tank; and e) distributing the treated waste effluent from the zeolite tank to a leach field.

16. The method of claim 15 which includes placing the septic system in non-absorptive, quartz sand soil.

17. The method of claim 15 which includes regenerating the zeolite material by flushing the zeolite tank with salt water.

18. The method of claim 15 wherein the zeolite material is selected from the group consisting of: clinoptilolite, phillipsite, mordenite, and erionite and combinations thereof.

19. The method of claim 15 which includes regenerating the zeolite material by heating the zeolite material to displace the captured nitrogen contaminants.

20. The method of claim 15 which includes regenerating the zeolite material by introducing nitrifying bacteria into the zeolite tank.

21. The method of claim 15 which includes adjusting the pH of the wastewater effluent entering the zeolite tank.

22. The method of claim 15 which includes regenerating the zeolite material by employing a liquid cation solution to displace the captured nitrogen contaminants.

* * * * *